United States Patent
Burris et al.

(10) Patent No.: US 10,964,141 B2
(45) Date of Patent: Mar. 30, 2021

(54) INTERNET-OF-THINGS (IOT) ENABLED LOCK WITH MANAGEMENT PLATFORM PROCESSING

(71) Applicant: NCR Corporation, Atlanta, GA (US)

(72) Inventors: Matthew Robert Burris, Atlanta, GA (US); Jodessiah Sumpter, Roswell, GA (US)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 16/224,541

(22) Filed: Dec. 18, 2018

(65) Prior Publication Data
US 2020/0193752 A1 Jun. 18, 2020

(51) Int. Cl.
| | |
|---|---|
| G07C 9/00 | (2020.01) |
| G06F 16/182 | (2019.01) |
| H04L 9/06 | (2006.01) |
| H04L 9/32 | (2006.01) |
| G07C 9/25 | (2020.01) |
| G07C 9/26 | (2020.01) |

(52) U.S. Cl.
CPC ..... *G07C 9/00571* (2013.01); *G06F 16/1824* (2019.01); *G07C 9/00912* (2013.01); *G07C 9/257* (2020.01); *H04L 9/0643* (2013.01); *H04L 9/3228* (2013.01); *G07C 9/26* (2020.01); *H04L 2209/38* (2013.01)

(58) Field of Classification Search
CPC ............ G07C 9/00571; G07C 9/00087; G07C 9/00912; G07C 2009/00095; G06F 16/1824; H04L 9/0643; H04L 9/3228; H04L 9/3231; H04L 2209/38

USPC .................................. 340/5.2, 5.52, 5.61
See application file for complete search history.

(56) References Cited

U.S. PATENT DOCUMENTS

| | | | | |
|---|---|---|---|---|
| 6,041,410 A | * | 3/2000 | Hsu ................... | G06K 9/00013 380/285 |
| 8,943,187 B1 | * | 1/2015 | Saylor ................. | G06F 21/6209 709/223 |
| 2002/0178385 A1 | * | 11/2002 | Dent ................... | G07C 9/00309 726/27 |
| 2005/0165806 A1 | * | 7/2005 | Roatis ................. | G06F 21/6209 |
| 2006/0072755 A1 | * | 4/2006 | Oskari ............... | G07C 9/00309 380/270 |
| 2006/0226951 A1 | * | 10/2006 | Aull ........................ | G06F 21/32 340/5.61 |

(Continued)

*Primary Examiner* — Edwin C Holloway, III
(74) *Attorney, Agent, or Firm* — Schwegman, Lundberg & Woessner

(57) ABSTRACT

An Internet-of-Things (IoT)-enabled lock is provided to control access to a secure physical asset. Disparate authorized systems make requests for an access and receive authorization to access the asset. An authorized user with an authorized mobile device is dispatched to the asset pursuant to a request. Proximity-based mobile device authentication is performed when the mobile device is in a configured proximity of the asset and the mobile device establishes a wireless connection to the lock. A second factor authentication is performed on the user that operated the mobile device. A One-Time Code (OTC) is generated and provided to either the lock or the mobile device for access to the asset. Access events and service information for the asset are stored in a shared data repository. Each system has access through to the shared data repository to all auditing information associated with the asset.

18 Claims, 6 Drawing Sheets

(56) References Cited

U.S. PATENT DOCUMENTS

| | | | | |
|---|---|---|---|---|
| 2012/0280783 A1* | 11/2012 | Gerhardt | ............. | H04W 12/003 |
| | | | | 340/5.6 |
| 2013/0176107 A1* | 7/2013 | Dumas | ............... | G07C 9/00571 |
| | | | | 340/5.61 |
| 2013/0237193 A1* | 9/2013 | Dumas | ............... | G07C 9/00571 |
| | | | | 455/414.1 |
| 2013/0325459 A1* | 12/2013 | Levien | .................. | G10L 15/065 |
| | | | | 704/231 |
| 2014/0375422 A1* | 12/2014 | Huber | ................ | G07C 9/00174 |
| | | | | 340/5.61 |
| 2015/0354262 A1* | 12/2015 | Chow | ....................... | E05G 1/04 |
| | | | | 109/59 R |
| 2017/0124534 A1* | 5/2017 | Savolainen | ............. | G09C 1/00 |
| 2018/0337769 A1* | 11/2018 | Gleichauf | ............. | H04L 9/3239 |

* cited by examiner

INTERNET-OF-THINGS (IOT) ENABLED LOCK WITH MANAGEMENT PLATFORM PROCESSING

BACKGROUND

Managing access to secure equipment and safes creates significant business challenges and overhead owner/operators and servicing organizations on several levels. Today, the most common way to manage access to these environments, such as a Self-Checkout (SCO) or an Automated Teller Machine (ATM) top boxes and even safes, is through management and distribution of physical keys to employees. This challenge is magnified by the number of different organizations that need to access the same system which typically include the owner, a repair and service organization, and a media replenishment group.

Some approaches may employ digital locks for these systems, with one-time-codes available by calling a call center and requesting access. However, each group that needs access to these secure systems manages and operates their own independent solution for access management and the systems are not connected.

As a result, auditing access to these systems is very challenging and time consuming. Furthermore, when discrepancies are encountered, each group with access produces their own audit records and the groups meet to figure out where the discrepancies arose, which is a very inefficient procedure.

SUMMARY

In various embodiments, methods and a transaction terminal for an IoT-enabled lock with management platform processing are presented.

According to an embodiment, a method for an IoT-enabled lock with management platform processing is presented. A first factor proximity-based authentication is performed against a device based on proximity of the device to a lock. A second factor authentication is processed against a user that operates the device. A one-time code (OTC) is provided for delivery to the lock based on the authentications. Finally, audit records are maintained for an asset associated with the lock in a shared Blockchain (BC) accessible to a plurality of disparate authorized systems that are allowed to access the asset.

DETAILED DESCRIPTION

Figure 1A:
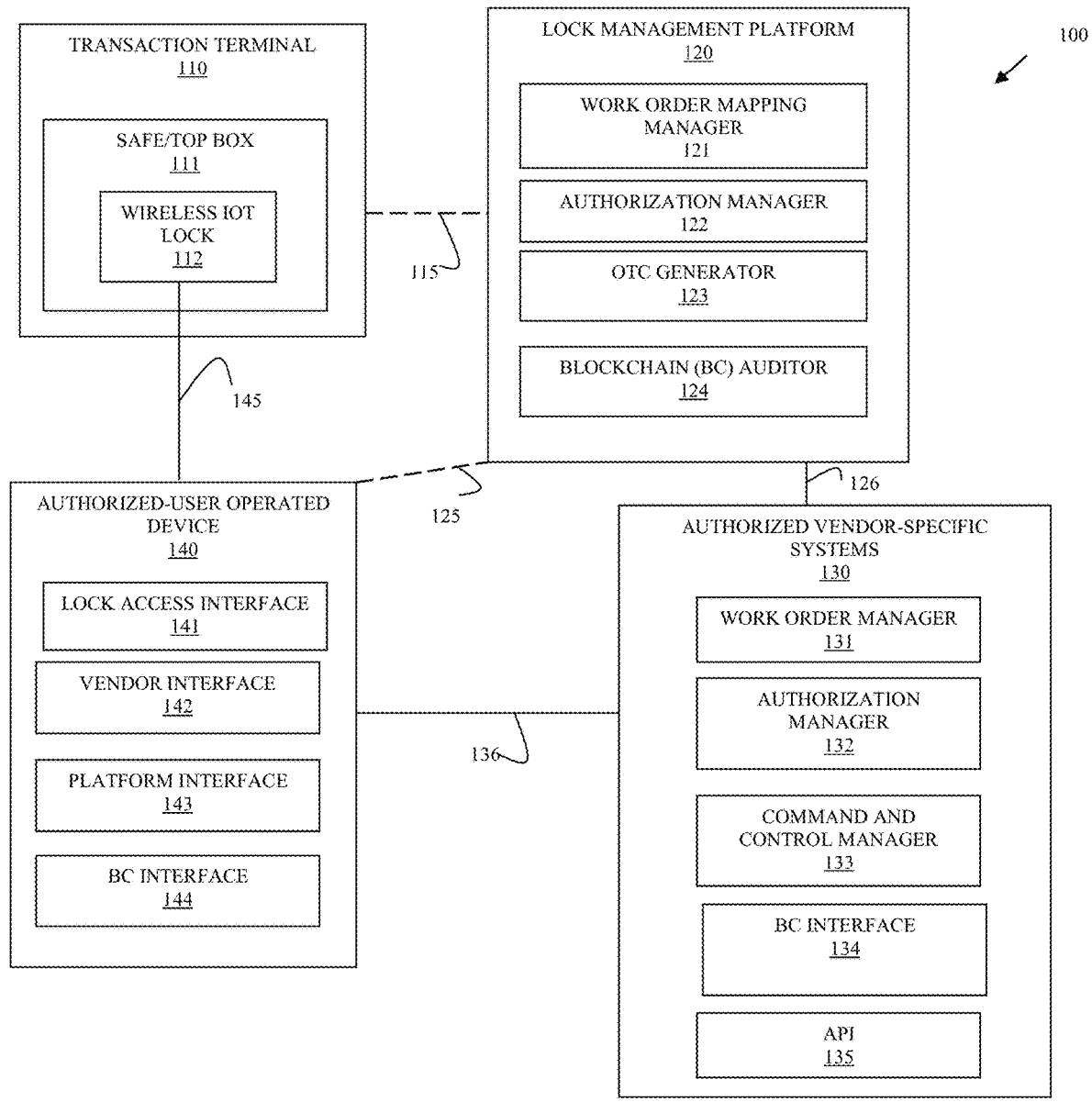
FIG. 1A is a diagram of a system for an IoT-enabled lock with management platform processing, according to an example embodiment.

FIG. 1 is a diagram of a system 100 for an IoT-enabled lock with management platform processing, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the techniques of an IoT-enabled lock with management platform processing, presented herein and below.

As used herein and below, the terms "customer," "consumer," "user," "engineer," "customer engineer," and "service engineer" may be used interchangeably and synonymously.

The system 100 includes a transaction terminal 110 having a safe/top box 111 and a novel wireless IoT lock 112 that controls locking and unlocking an access door to the safe/top box 111.

The system 100 further includes a lock management platform 120 having a work order mapping manager 121, an authorization manager 122, a One-Time Code (OTC) generator 123, and a Blockchain (BC) auditor 124.

The system 100 additionally includes a plurality of authorized-vendor specific systems 130. Each system 130 having a work order manager 131, an authorization manager 132, a command and control manager 133, optionally, a BC interface 134, and an Application Programming Interface (API) 135.

Finally, the system 100 includes a plurality of authorized-user operated devices 140, each device 140 having a lock access interface 141, a vendor interface 142 for interaction with a system 130, optionally, a platform interface 143 for interaction with the platform 120, and, optionally, a BC interface 144.

The platform 120 includes one or more logically cooperating servers that include one or more hardware processors and non-transitory computer-readable storage mediums. The work order mapping manager 121, the authorization manager 122, the OTC generator 123, and the BC auditor 124 are provided as executable instructions within the non-transitory computer-readable storage mediums and executed by the one or more hardware processors.

Each authorized vendor-specific system 130 includes one or more servers that cooperate to provide access to the system 130. Each system 130 includes one or more hardware processors and non-transitory computer-readable storage mediums. The work order manager 131, the authorization manager 132, the command and control manager 133, the BC interface 134, and the API 135 are provided as executable instructions within the non-transitory computer-readable storage mediums and executed by the one or more hardware processors.

Each authorized-user operated device 140 includes one or more hardware processors and non-transitory computer-readable storage mediums. The lock access interface 141, the vender interface 142, the platform interface 143, and the BC interface 144 are provided as executable instructions within the non-transitory computer-readable storage mediums and executed by the one or more hardware processors.

In an embodiment, the software modules 141-144 are subsumed into a single software module, referred to herein as mobile application (app) 141-144.

Each system 130 includes an API 135 that permits interaction with the platform 120 over wired, wireless, or a combination of wired and wireless network connection. The API 135 allows a specific system 130 to register with platform 120 and to authenticate for access to the platform 120. In an embodiment, the API 135 and the platform are in a secure and trusted relationship during the network connection 126 (such as through custom encryption protocols, digital certificates, digital signatures, and the like).

The API 135 also permits each system 130 to register authorized users and their devices 140 through the authorization manager 132 of the system 130 and the authorization manager 122 of the platform 120.

In an embodiment, the authorization managers 122 and 132 do not have to store identifying data for the registered authorized users; rather, a hash value produced from the identifying data of a user can be stored and compared when a user authenticates with user-provided identifying data.

Once the systems 130 and their authorized users are registered, each specific system's work order manager 131 may trigger the API 135 to contact the work order mapping manager 121 on the platform 120. So, when a ticket for service to a safe/top box 111 is generated within a vendor-specific system 130, the API 135 requests creation of a platform work order through interaction with the work order mapping manager 121. The work order mapping manager 121 creates a new work order that is in the format needed by the platform 120 to generate an OTC by the generator 123. The platform's work order identifier is mapped to a system identifier for the system 130 and the work identifier assigned by the system 130 for the corresponding work order opened within the system 130 by the system's work order manager 131.

A variety of actions initiated by authorized users from the devices 140 and/or from the novel wireless IoT lock can initiate the OTC generator 123 to generate a one-time access code that can be used by the device 140 to unlock the lock 112 and access the safe/top box for service associated with the opened work order. It is noted that these actions will cause the generator 123 to provide an OTC when there is no work order that is open defining a service need to access the safe/top box 111.

In an embodiment, the lock 112 is configured with firmware that executes on a processor of the lock 112 from a non-transitory computer-readable storage medium or memory. The firmware is configured to validate OTCs provided to it based on a current date and time of day and based on a key unique to the lock 112 and a key unique to the platform 120. If the lock 112 receives a validated OTC, the lock mechanism is unlocked and access is provided to the safe/top box 111. The OTC (as discussed below) may be received from the platform over optional network connection 115 or may be received wirelessly over network connection 145 between the user device 140 and the lock 112.

Because authorized users and their devices 140 are registered by the systems 130, the devices 140 may also optionally connect directly to the platform 120 over wireless network connection 125. Alternatively, the secure connection between systems 130 and the platform 120 may be used by the devices 140 for receiving the OTC over wireless network connection 136 indirectly from the platform 120 through the system 130.

Before the device 140 is authenticated for receiving an OTC from the generator 123 directly over the platform interface 143 or is authenticated for receiving the OTC from the command and control manager 133 (which obtains the OTC on behalf of the device 140 from generator 123 using API 135), the authorization managers 122 or 132 1) ensures that the device is in proximity to the terminal 110 and then separately 2) authenticates the authorized user of the device 140. Once these two conditions are satisfied, the generator 123 produces the OTC and it is either sent on behalf of the user directly to the lock over 115, is sent directly to the device 140 over 125, or is sent to the command and control manager 133 for delivery to the device 140 over 136.

Ensuring 1) (device 140 in geographical proximity to lock 112) can be processed in a number of manners, each of these manners are not mutually exclusive such that multiple or combinations may be required for added security. 1) represents a first factor authentication of the device 140. The manners include: entry by the user of device 140 of a serial number associated with the lock 112 and/or the terminal 110; entry of a serial number for the device 140 into an administrative interface of the terminal 110, pressing a button situated somewhere on the fascia of the terminal 110 that initiates a wireless pairing between the lock 112 and the device 140 over wireless connection 145 and entering a pairing key (obtained previously either from the platform 120 or the system 130), obtaining by an Operating System (OS) of the device 140 a pairing key needed to establish connection 145 from either the platform 120 over 125 or the system 130 over 136 (key obtained dynamically when device is ready-key may also be randomly changed based on time and/or day), scanning a barcode or Quick Response (QR) code displayed on the terminal 110 fascia to obtain a pairing key for connection over 145 with the lock 112, and/or utilizing location information reported from the device 140 and/or a known location or a reported location for the lock 112 to determine the device 140 is in proximity to the lock 112 and push a pairing code to the device for establishing connection 145 when the device 140 is within a configured threshold distance of the lock 112.

The authorized user lacks any OTC at this point in time and will not receive one or have one sent on behalf of the user, until 2) is performed, which is a second factor authentication to authenticate the user. The first factor authentication 1) was to authenticate the device 140 and proximity of the device 140 to the lock 112. The second factor authentication 2) can include a variety of authentication processing. Again, the authentication processing is not mutually exclusive such that more than 1 of the processing may be required or in some instances just one is required. When the device 140 is connected over 125, then the device 140 performs the second factor authentication with the authorization manager 122 using the platform interface 143. When the device 140 is connected with the system 130 over 136, the device 140 performs the second factor authentication with the authorization manager 132 using the vendor interface 142. The second factor authentication processing can include one or more of: biometric authentication of the user (palm print, iris scan, fingerprint, facial recognition, gesture recognition, etc.), user name and password entry, just password entry, and/or an encrypted key possessed by the user on the device.

Assuming the user and the device 140 have successfully passed through the first and second authentication, and assuming that a valid open work order for the safe/top 111 is open, the OTC generator 123 generates the OTC as a time-specific and time-expiring one-time code. As discussed above, the OTC generator 123 may: send the OTC directly to the lock 112 over 115, send the OTC directly to the device 140 over 125, or send the OTC directly to the system 130 through command and control manager 133 for delivery from the command and control manager to the device 140 through the vendor interface 142.

The device 140 is now in possession of a valid OTC and has a wireless connection to the lock 112 over 145 (based on having passed the first-factor authentication), the device 140 uses the lock access interface 141 to provide the OTC to the lock 112 (this is an embodiment where the platform 120 did not directly send the OTC to the lock 112 on behalf of the user). The user than performs any required service, such as media replenishment, media cassette replacement, or whatever is required by the work order.

When the lock 112 is opened an event is generated that includes the time of day and calendar day as well as the user (service engineer) identifier, terminal identifier for the terminal 110, and lock identifier for the lock 112. Another even is generated with similar information when the lock 112 is closed. This information may be captured and logged in a variety of locations, such as on the device 140 (received over the wireless connection 145 from the terminal 110 or the lock 112), on the lock 112, and/or on the terminal 110 in storage that is external to the lock 112.

The vendor interface 142 may also receive specific entered information provided by the user (service engineer) on the service that the user completed or attempted to complete within the safe/top box 111.

The event information and the specific workload service information provided by the user is then hashed by one of: the BC interface 144 of the device 140, the BC interface 134 of the system 130, or the BC auditor 124 of the platform 120. In cases where it is the system 130 performing the hashing and BC insertion of audit records for the lock 112, the device 140 automatically provides the information over 136 to the command and control manager 133 and/or the work order manager 131, the command and control manager 133/work order manager 131 uses the BC interface 134 for BC insertion. In cases, where it is the platform 120 performing the hashing and BC insertion of the audit records for the lock 112, the device 140 automatically provides the information over 125 through the platform interface 143 to the BC auditor 124 for BC insertion.

The audit records inserted into the BC can be indexed on a variety of custom information, such as lock identifier for the lock 112, terminal identifier for the terminal 110, device identifier for the device 140, employee identifier for the user of the system 130, and system identifier for the system 130.

Audit records can only be inserted into the BC, such that audit records cannot be edited or deleted from the BC. The BC is maintained by one or more of: the BC auditor 124, the BC interface 144, and the BC interface 134. Each separate vendor that has authorized access to the lock 112 or terminal 110, can uses its interface 134 to search the BC and obtain all the audit records for the lock 112 including audit records associated with different vendors having different systems 130.

The BC solves an important problem in the industry, because multiple authorized vendors each having multiple authorized users no longer have to maintain individual and system specific audit records that are incomplete because they lack audit records from other vendors. Although it is to be noted that each vendor may continue to use their legacy auditing systems in addition to the shared BC provided herein. The shared BC allows for cross-system 130 (disparate system 130) sharing of complete audit records for the lock 112 and/or the terminal 110. Each separate vendor can access the BC independent of the platform 120 and receive a full and complete audit history for the lock 112 and terminal 110.

The lock 112 is an IoT-enabled device that includes a wireless transceiver, a processor, memory, and a non-transitory computer-readable storage medium, which includes firmware representing executable instructions that are executed by the processor.

In an embodiment, the wireless transceiver is one of: Bluetooth®, Near Field Communication (NFC), Bluetooth® Low Energy (BLE), Radio Frequency (RF), and Wi-Fi.

In an embodiment, the lock 112 includes more than 1 wireless transceiver.

In an embodiment, the terminal 110 is one of: a Self-Service Terminal (SST), an ATM, a kiosk, a self-checkout terminal, and a Point-Of-Sale (POS) terminal.

In an embodiment, the device 140 is one of: a wearable processing device, a phone, and a tablet.

In an embodiment, the lock 112 reports its location information to the platform 120 at preconfigured periods of time. The platform 120 detects when the terminal 110 associated with the lock 112 is moved to a different location when the user of the device 140 is attempting a first factor authentication on proximity of the device 140 to the lock 112. The platform 120 provides a new location for the terminal 110 and the lock 112 to the user through the platform interface 143.

In an embodiment, the lock 112 is deployed on any equipment or electronics that require secure access, such that the lock 112 is independently used of the safe/top box 111 of the terminal 110. The above-referenced processing can be performed similar on whatever asset that the lock 112 is deployed to control access to.

In an embodiment, the lock 112 lacks any wired connection within the terminal 110, such that the lock 112 is unable to communicate over a wired connection to terminal 110 or to the Internet for reaching the platform 120. Here, the only connection available to the lock 112 is through the wireless connection 145 with a device 140 in proximity to the lock 112. A separate rechargeable battery is connected to an Alternating Current (AC) power supply or connected to an AC power source of the terminal 110, when AC power is cut or off, the lock 112 is powered over Direct Current (DC) from the battery providing an uninterrupted power source to the lock 112. In this embodiment, the audit and event logging is processed by each connecting device 140 in the manners that were discussed above.

In an embodiment, the lock 112 includes a BC interface and participates in audit record insertion by inserting event information relevant to opening and closing the lock 112.

In an embodiment, the platform 120 is provided as a Software-as-a-Service (SaaS) to manage the lock 112 and interact with the systems 130 and authorized devices 140.

One now appreciates how the system including the lock 112 and the platform 120 provide a comprehensive solution to secure access to a safe/top box 111 of a transaction terminal 110 independent of multiple separate authorized systems 130 and devices 140 that are authorized to access the safe/top box 111. The system 100 also provides for comprehensive auditing across multiple and disparate systems 130, such that a complete auditing of the lock 112 can occur detailing access by all the authorized vendors (associated with the systems 130). Moreover, each vendor can independently access the audit records through a shared auditing BC.

Figure 1B:
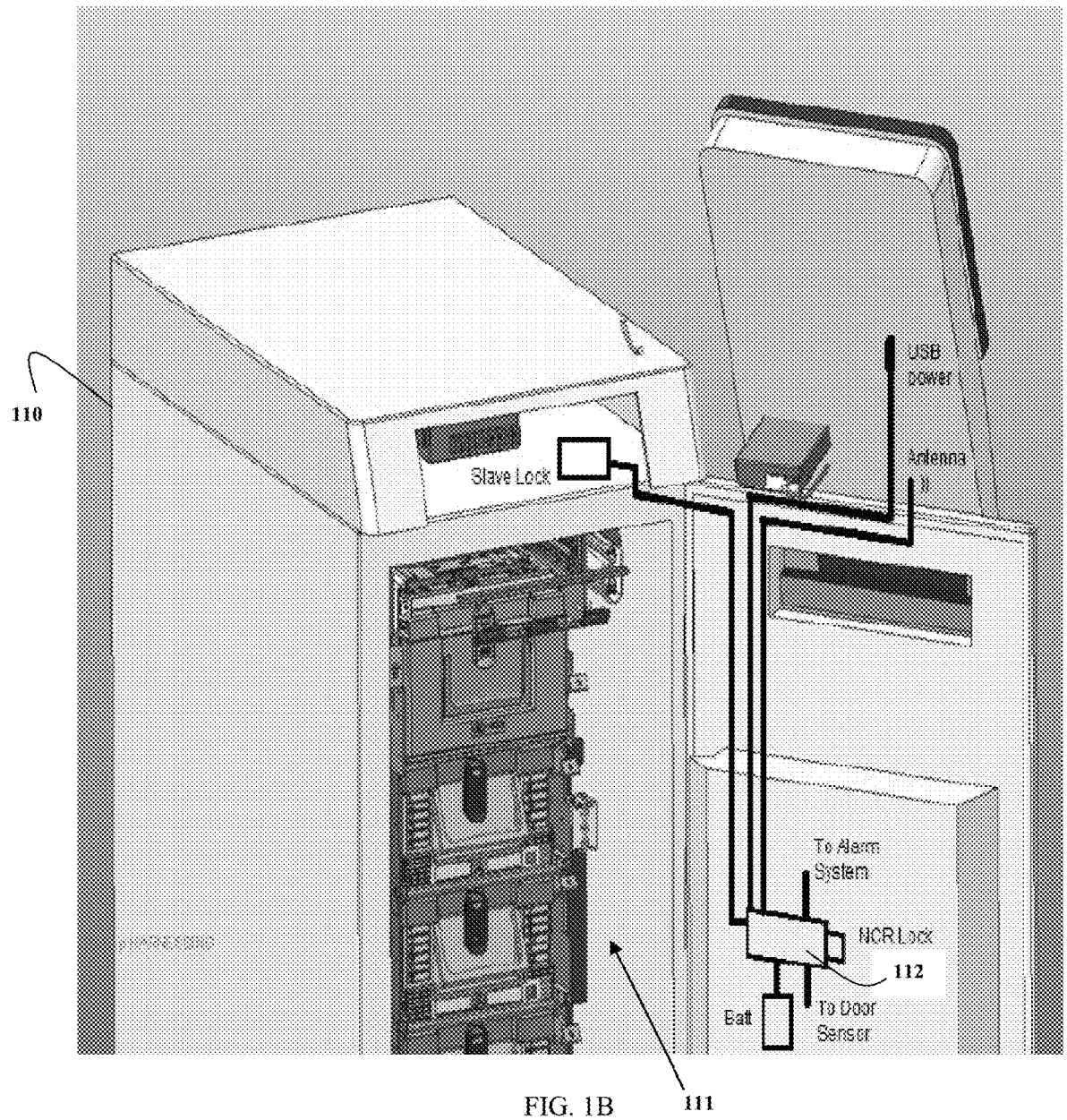
FIG. 1B is a diagram of a transaction terminal having an IoT-enabled lock, according to an example embodiment.

FIG. 1B is a diagram of a transaction terminal 110 having an IoT-enabled lock 112, according to an example embodiment. The FIG. 1B illustrates an architectural layout for the lock 112 within an inside of an access door to a safe/top box 111 of an ATM 110. The lock 112 is connected to a rechargeable battery, an alarm system, a slave lock, an antenna, and AC power through a Universal Serial Bus (USB) wired connection as illustrated in the FIG. 1B.

Figure 1C:
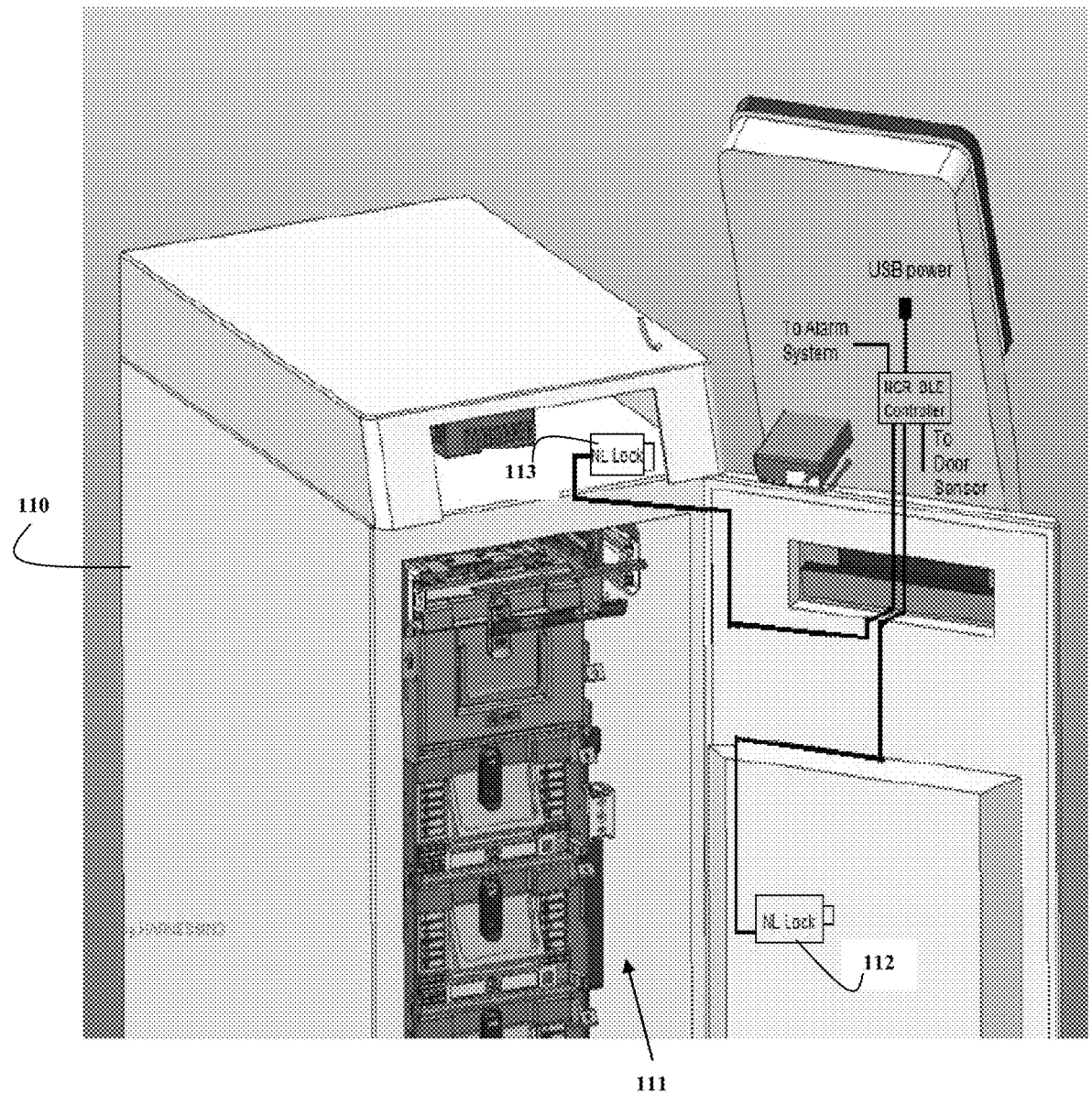
FIG. 1C is a diagram of a transaction terminal having multiple IoT-enabled locks, according to an example embodiment.

FIG. 1C is a diagram of a transaction terminal 110 having multiple IoT-enabled locks 112, according to an example embodiment. Two locks 112 and 113 are connected to a BLE controller, the BLE controller connected to a door sensor for the safe 111 and the alarm system. The lock 112 is for controlling access to the safe 111 (through the safe door) and the lock 113 is for controlling access to the top box 111 (separate from the safe 111 although labeled as one item in the FIGS.).

These and other embodiments are now discussed with reference to the FIGS. 2-4.

Figure 2:
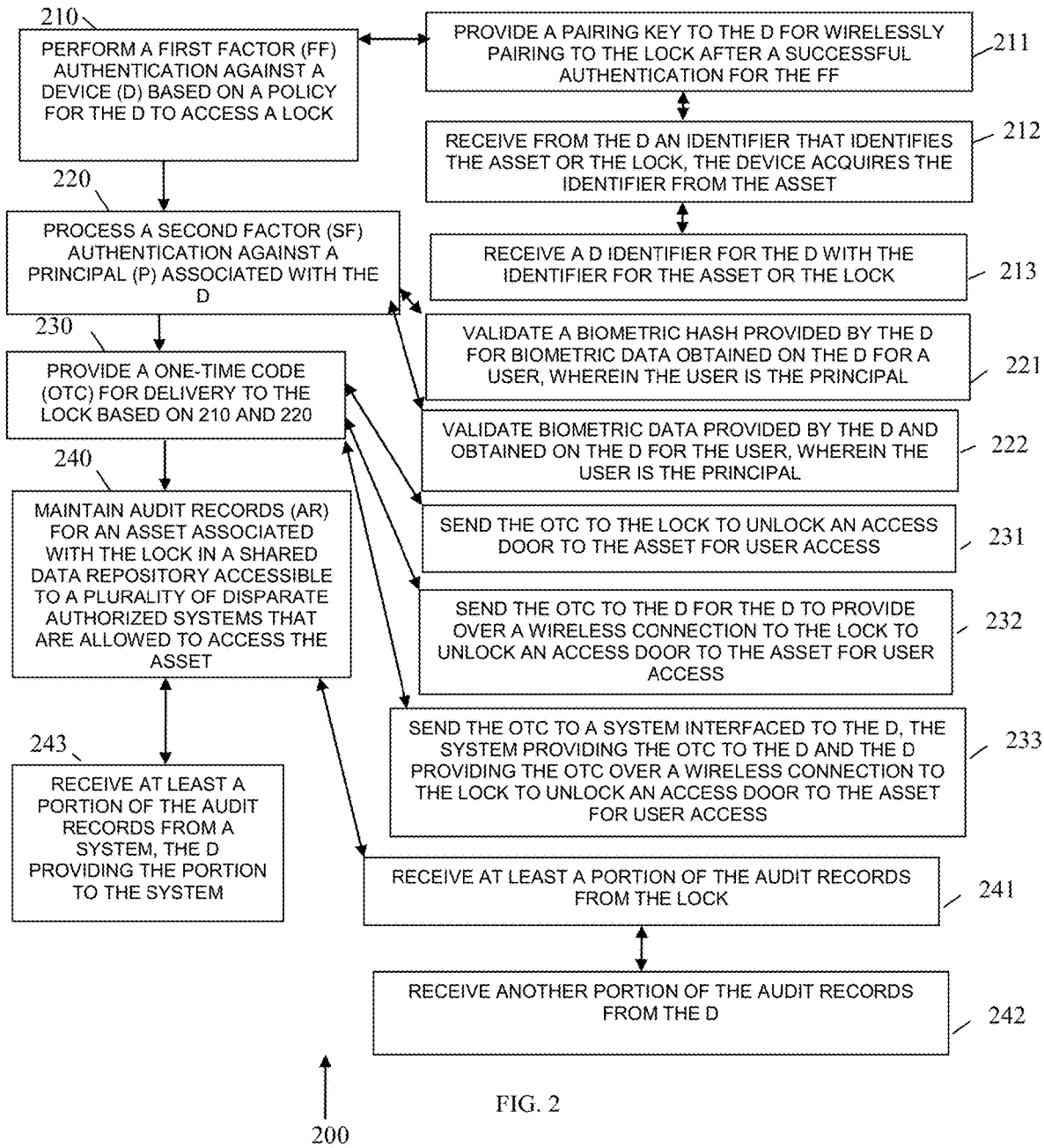
FIG. 2 is a diagram of a method for an IoT-enabled lock with management platform processing, according to an example embodiment.

FIG. 2 is a diagram of a method 200 for an IoT-enabled lock with management platform processing, according to an example embodiment. The software module(s) that implements the method 200 is referred to as an "IoT lock manager service." The d IoT lock manager service is implemented as executable instructions programmed and residing within memory and/or a non-transitory computer-readable (processor-readable) storage medium and executed by one or more processors of a device. The processor(s) of the device that executes the IoT lock manager service are specifically configured and programmed to process the IoT lock manager service. The device that executes the IoT lock manager service has access to one or more network connections during its processing. The network connections can be wired, wireless, or a combination of wired and wireless.

In an embodiment, the device that executes the IoT lock manager service is a collection of servers logically cooperating as the platform 120. In an embodiment, the servers form a cloud-computing environment that services multiple disparate systems 130, multiple customer-operated devices 140, and/or multiple transaction terminals 110 having one or more IoT-enabled locks 112.

In an embodiment, the IoT lock manager service is a combination of: 121-124 configured to perform the processing discussed above with the FIG. 1 with respect to platform 120.

In an embodiment, the IoT lock manager service is provided as a SaaS to multiple disparate authorized systems 130 and multiple disparate authorized user-operated devices 140.

At 210, the IoT lock manager service performs a first factor authentication against a mobile device based on a policy for the mobile device to access an IoT lock 112 or 113.

In an embodiment, at 211, the IoT lock manager service provides a pairing key to the mobile device for the mobile device to wirelessly pair to the IoT lock 112 or 113 after successful first factor authentication is performed at 210. In an embodiment, the policy identifies the first factor authentication as a proximity-based first factor authentication.

In an embodiment of 211 and at 212, the IoT lock manager service receives from the device an identifier that identifies the asset or the lock 112 or 113. The mobile device acquires the identifier from the asset (such as by scanning a QR code or barcode).

In an embodiment of 212 and at 213, the IoT lock manager service receives a mobile device identifier for the device with the identifier for the asset or the IoT lock 112 or 113.

At 220, the IoT lock manager service processes a second factor authentication against a principal associated with the mobile device.

In an embodiment, the principal is a user.

In an embodiment, the principal is an autonomous robot that operates the device of includes the device as an integrated component of the autonomous robot.

In an embodiment, at 221, the IoT lock manager service validates a biometric hash provided by the mobile device for biometric data obtained on the mobile device for a user. Here, the principal is the user.

In an embodiment, at 222, the IoT lock manager service validates biometric data provided by the mobile device and obtained on the mobile device for a user. The biometric data can be any of data relevant to: a palm print, a finger print, facial recognition, iris scan, and a unique gesture. In this embodiment, the principal is a user.

In an embodiment, the second factor authentication can be any of the second factor authentications discussed above with the FIG. 1A.

At 230, the IoT lock manager service provides an OTC for delivery to the IoT lock 112 or 113 based on 210 and 220.

In an embodiment, at 231, the IoT lock manager service sends the OTC to the lock to unlock an access door to the asset for user access.

In an embodiment, at 232, the IoT lock manager service sends the OTC to the mobile device for the mobile device to provide over a wireless connection to the IoT lock 112 or 113 to unlock an access door to the asset for user access.

In an embodiment, at 233, the IoT lock manager service sends the OTC to a system 130 interfaced to the mobile device 140. The mobile device 140 providing the OTC over a wireless connection to the IoT lock 112 or 113 to unlock an access door to the asset for user access.

At 240, the IoT lock manager service maintains audit records for an asset associated with the IoT lock 112 or 113 in a shared data repository that is accessible and maintained by a plurality of disparate authorized systems 140 that are allowed to access the asset and that include their own authorized users, one of which is the principal that is operating the mobile device. In an embodiment, the principal is a user. In an embodiment, the principal is an autonomous robot. In an embodiment where the principal is a robot, the mobile device can be operated by the robot or the mobile device can be part of the robot.

In an embodiment, the shared repository is a shared BC that each system hashes to store audit records and searches to retrieve audit records. The storing and searching may also be performed by the mobile device, the platform, and/or the principal (user or an autonomous robot).

In an embodiment, at 241, the IoT lock manager service receives at least a portion of the audit records from the IoT lock 112 or 113.

In an embodiment of 241 and at 242, the IoT lock manager service receives another portion of the audit records from the mobile device.

In an embodiment, at 243, the IoT lock manager service receives at least a portion of the audit records from a system 140. The mobile device providing the portion to the system 140.

Figure 3:
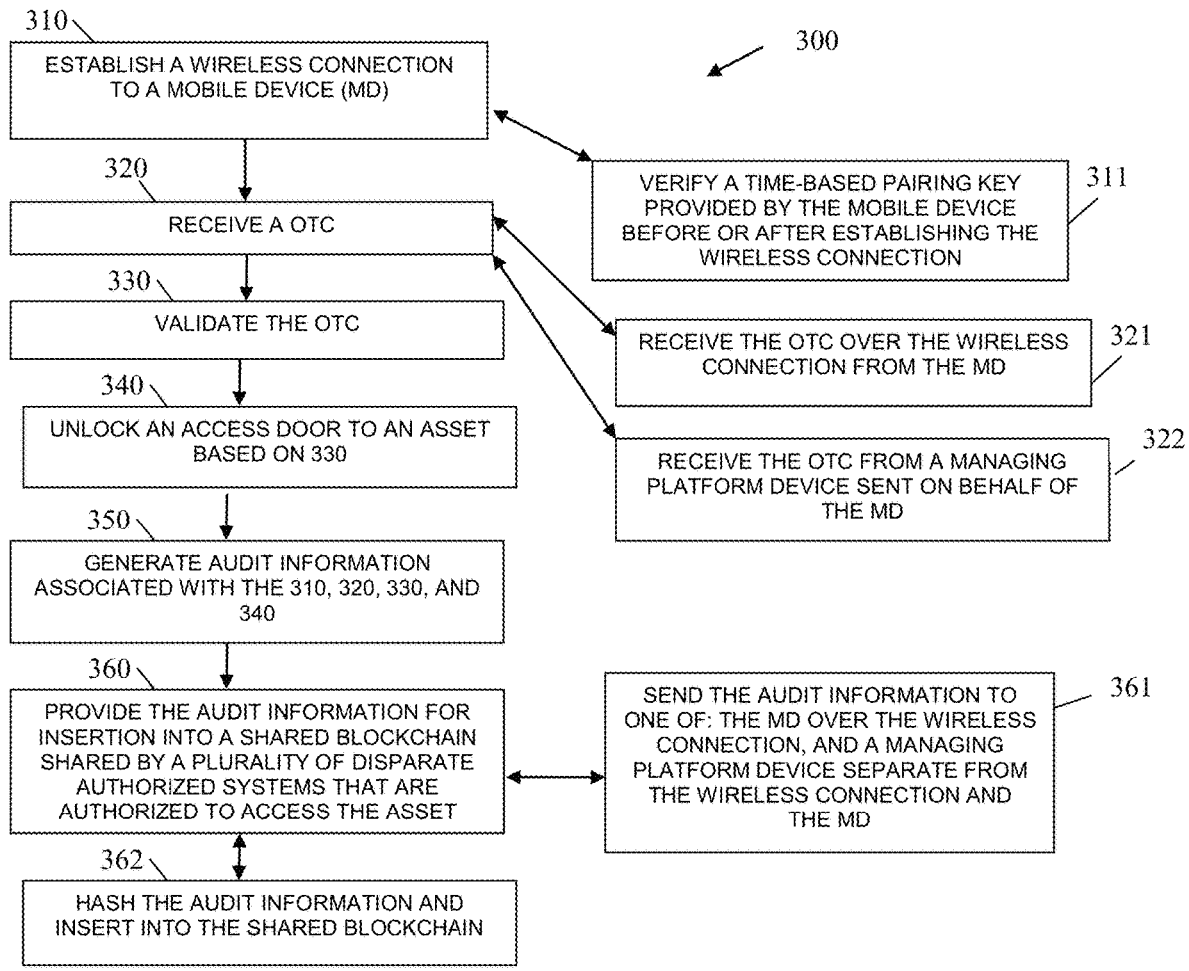
FIG. 3 is a diagram of another method for an IoT-enabled lock with management platform processing, according to an example embodiment.

FIG. 3 is a diagram of another method 300 for an IoT-enabled lock with management platform processing, according to an example embodiment. The software module(s) that implements the method 300 is referred to as a "shared remotely managed lock service." The shared remotely managed lock service is implemented as executable instructions programmed and residing within memory and/or a non-transitory computer-readable (processor-readable) storage medium and executed by one or more processors of an IoT lock. The processors that execute the shared remotely managed lock service are specifically configured and programmed to process the shared remotely managed lock service. The device that executes the shared remotely managed lock service has access to one or more network connections during its processing. The network connections can be wired, wireless, or a combination of wired and wireless.

In an embodiment, the device that execute the shared remotely managed lock service is the IoT lock 112.

In an embodiment, the shared remotely managed lock service is all of or some combination of processing associated with the IoT lock 112 as discussed in the FIG. 1 and the FIG. 2.

At 310, the shared remotely managed lock service establishes a wireless connection to a mobile device. The wireless connection can be over: Bluetooth®, NFC, BLE, and/or Wi-Fi.

In an embodiment, at 311, the shared remotely managed lock service verifies a time-based pairing key provided by the mobile device before or after the wireless connection is established at 310.

At 320, the shared remotely managed lock service receives an OTC.

In an embodiment, at 321, the shared remotely managed lock service receives the OTC over the wireless connection from the mobile device.

In an embodiment, at 322, the shared remotely managed lock service receives the OTC from a managing platform 120 device sent on behalf of the mobile device.

At 330, the shared remotely managed lock service validates the OTC.

At 340, the shared remotely managed lock service unlocks an access door to an asset based on 330.

At 350, the shared remotely managed lock service generates audit information associated with the processing at 310, 320, 330, and 340.

At 360, the shared remotely managed lock service provides the audit information for insertion into a shared BC shared by a plurality of disparate authorized systems 130 that are authorized to access the asset.

In an embodiment, at 361, the shared remotely managed lock service sends the audit information to one of: the mobile device over the wireless connection and a managing platform 120 device separate from the wireless connection and the mobile device.

In an embodiment, at 362, the shared remotely managed lock service hashes the audit information and inserts the hashed audit information into the shared BC.

Figure 4:
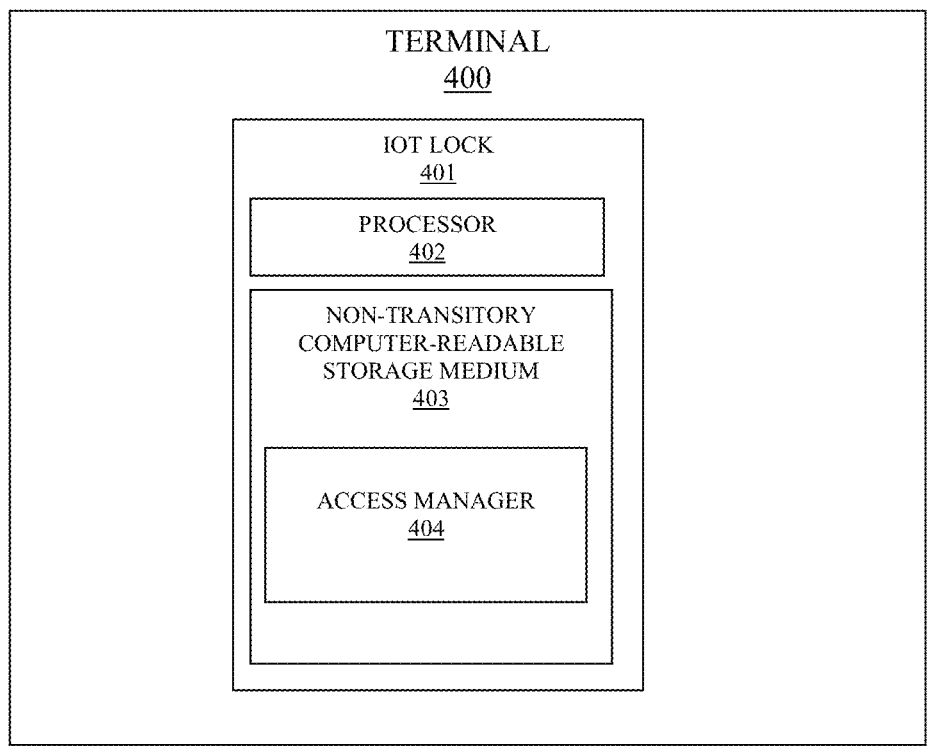
FIG. 4 is a diagram of a system for an IoT-enabled lock with management platform processing, according to an example embodiment.

FIG. 4 is a diagram of a transaction terminal 400 for an IoT-enabled lock with management platform processing, according to an example embodiment. The terminal 400 includes a variety of hardware components and software components. The software components of the terminal 400 are programmed and reside within memory and/or a non-transitory computer-readable medium and execute on one or more processors of the terminal 400. The terminal 400 communicates over one or more networks, which can be wired, wireless, or a combination of wired and wireless.

In an embodiment, the terminal 400 implements, inter alia, the processing described above with the FIGS. 1-3.

The terminal 400 includes an IoT lock 401. The IoT lock 401 including a hardware processor 402, a non-transitory computer-readable storage medium 403 having executable instructions/firmware instructions representing an IoT access manager 404, and a wireless transceiver 405.

In an embodiment, the terminal 400 is a SST.

In an embodiment, the terminal 400 is an ATM

In an embodiment, the terminal 400 is a kiosk.

In an embodiment, the terminal 400 is a POS terminal.

In an embodiment, the terminal 400 is a secure server.

In an embodiment, the terminal 400 is the transaction terminal 110.

In an embodiment, the terminal 400 is an autonomous robot.

In an embodiment, the terminal 400 is a gas pump.

In an embodiment, the terminal 400 is a secure server where access is restricted to the secure service and must be authenticated.

The IoT access manager 404 when executed on the hardware processor 402 from the non-transitory computer-readable storage medium 403 is configured to perform processing to: establish a wireless connection with a mobile device; receive a OTC; validate the OTC; unlock or unlock an asset door to a secure asset when the OTC is validated; and provide audit information associated with the wireless connection and unlocking the asset door for insertion in a shared Blockchain that is shared between disparate systems authorized to access the secure asset.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
    performing a first factor authentication against a device based on a policy for the device to access a lock, wherein the policy comprises a proximity condition associated with a proximity between the device and the lock when performing the first factor authentication, and wherein the performing is initiated based on pressing a button by an operator of the device, wherein the button is situated on a fascia of a transaction terminal, and wherein the transaction terminal comprising a safe having the lock;
    receiving a pairing key from the device, wherein the pairing key obtained from the device from a system and the pairing key is randomly changed based on time and day by the system;

establishing a wireless connection with the device based on the pairing key;

processing a second factor authentication against a principal associated with the device;

providing a one-time code (OTC) for delivery to the lock based on the performing and the processing, wherein providing further includes providing the OTC as a validation code that the lock independently validates based on a date, a time of day, a first key unique to the lock, and a second key unique to a processing platform associated with the method; and maintaining audit records for an asset associated with the lock in a shared data repository accessible to a plurality of disparate authorized systems that are allowed to access the asset.

2. The method of claim 1, wherein providing further includes receiving from the device an identifier that identifies the asset or the lock, the device acquiring the identifier from the asset.

3. The method of claim 2, wherein receiving further includes receiving a device identifier for the device with the identifier for the asset or the lock.

4. The method of claim 1, wherein processing further includes validating a biometric hash provided by the device for biometric data obtained on the device for a user, wherein the user is the principal.

5. The method of claim 1, wherein processing further includes validating biometric data provided by the device and obtained on the device for a user, wherein the user is the principal.

6. The method of claim 1, wherein providing further includes sending the OTC to the lock to unlock an access door to the asset for user access.

7. The method of claim 1, wherein providing further includes sending the OTC to the device for the device to provide over the wireless connection to the lock to unlock an access door to the asset for user access.

8. The method of claim 1, wherein providing further includes sending the OTC to the system interfaced to the device, the system providing the OTC to the device and the device providing the OTC over the wireless connection to the lock to unlock an access door to the asset for user access.

9. The method of claim 1, wherein maintaining further includes receiving at least a portion of the audit records from the lock.

10. The method of claim 9, wherein receiving further includes receiving another portion of the audit records from the device.

11. The method of claim 1, wherein maintaining further includes receiving at least a portion of the audit records from the system, the device providing the portion to the system.

12. A method, comprising:

establishing a wireless connection to a mobile device, wherein the establishing of the wireless connection is an indication: that the mobile device is in proximity to a transaction terminal based on the mobile device scanning a Quick Response (QR) code from the transaction terminal and that the operator successfully completed authentication for establishing the wireless connection, wherein establishing further includes receiving a pairing key provided by the mobile device for establishing the wireless connection, wherein the mobile device obtains the pairing key from a system and the pairing key is randomly changed based on time and day by the system, and establishing the wireless connection based on the pairing key received from the mobile device;

receiving a One-Time Code (OTC);

validating the OTC based at least on a date, a time of day, a first key unique to a lock associated with the access door for a safe of the transaction terminal, and a second key unique to a processing platform that generated the OTC;

unlocking an access door to an asset based on the validating;

generating audit information associated with the establishing, the receiving, the validating, and the unlocking; and providing the audit information for insertion into a shared Blockchain shared by a plurality of disparate authorized systems that are authorized to access the asset.

13. The method of claim 12, wherein receiving further includes receiving the OTC over the wireless connection from the mobile device.

14. The method of claim 12, wherein receiving further includes receiving the OTC from a managing platform device sent on behalf of the mobile device.

15. The method of claim 12, wherein providing further includes sending the audit information to one of: the mobile device over the wireless connection, and a managing platform device separate from the wireless connection and the mobile device.

16. The method of claim 12, wherein providing further includes hashing the audit information and inserting into the shared Blockchain.

17. A terminal, comprising:

a button;

a safe comprising and Internet-of-Things (IoT) lock;

the Internet-of-Things (IoT) lock, the IoT lock comprising:

a hardware processor;

a non-transitory computer-readable storage medium having executable instructions;

the executable instructions when executed by the hardware processor from the non-transitory computer-readable storage medium configured to perform processing to:

establish a wireless connection with a mobile device based on activation of the button by an operator of the mobile device indicating that the operator is in proximity to the terminal and has successfully authenticated with a server for establishing the wireless connection, wherein a pairing key is provided by the mobile device for establishing the wireless connection, wherein the mobile device obtains the pairing key from a system and the pairing key is randomly changed based on time and day by the system, and the wireless connection established based on the pairing key received from the mobile device;

receive a One-Time Code (OTC);

validate the OTC;

unlock or lock an asset door to the safe of the terminal when the OTC is validated based on a date, a time of day, a first key associated with the hardware processor, and a second key associated with a processing platform that generated the OTC; and provide audit information associated with the wireless connection and unlocking the asset door for insertion in a shared Blockchain that is shared between disparate systems authorized to access the safe.

18. The terminal of claim 17, wherein the terminal is one of: a Self-Service Terminal (SST), an Automated Teller Machine (ATM), a kiosk, a Point-Of-Sale (POS) terminal, a secure server, a robot, and a gas pump.

* * * * *